United States Patent [19]

Rossi et al.

[11] Patent Number: 4,532,270

[45] Date of Patent: Jul. 30, 1985

[54] HIGH TEMPERATURE STABLE ADHESIVE COMPOSITIONS EMPLOYING AROMATIC POLYIMIDE AND POLYISOIMIDE BIS-ACETYLENE ADDITIVES

[75] Inventors: Robert D. Rossi, Levittown, Pa.; Dilip K. Ray-Chaudhuri, Bridgewater, N.J.

[73] Assignee: National Starch and Chemical Corporation, Bridgewater, N.J.

[21] Appl. No.: 574,448

[22] Filed: Jan. 27, 1984

[51] Int. Cl.$^3$ .................. C08K 5/34; C08F 238/00
[52] U.S. Cl. .................. 523/176; 526/259; 525/426; 524/720; 524/854; 548/433
[58] Field of Search .................. 523/176; 525/426; 526/259; 524/720, 854

[56] References Cited

U.S. PATENT DOCUMENTS

| 3,639,348 | 2/1972 | D'Alelio | 526/285 |
| 3,845,018 | 10/1974 | Bilow et al. | 260/47 |
| 3,879,349 | 4/1975 | Bilow et al. | 260/47 |
| 3,988,299 | 10/1976 | Malofsky | 526/258 |
| 4,098,767 | 7/1978 | Bilow | 525/426 |
| 4,100,138 | 7/1978 | Bilow | 525/426 |
| 4,316,974 | 2/1982 | Ohmura | 525/426 |
| 4,365,034 | 12/1982 | Grimes | 526/259 |
| 4,371,676 | 2/1983 | Hoene | 526/285 |
| 4,381,363 | 4/1983 | Reinhart | 526/259 |
| 4,404,139 | 9/1983 | D'Alelio | 525/426 |
| 4,405,770 | 9/1983 | Schoenberg | 526/259 |
| 4,417,038 | 11/1983 | Vogel | 526/285 |
| 4,431,792 | 2/1984 | St. Clair | 525/426 |

FOREIGN PATENT DOCUMENTS 0071372 2/1983 European Pat. Off. .

Primary Examiner—C. Warren Ivy
Attorney, Agent, or Firm—Edwin M. Szala; Lori D. Tolly

[57] ABSTRACT

Novel curing compositions are prepared comprising an acrylic or substituted acrylic monomer and a normal polyimide or polyisoimide bis-acetylene additive.

11 Claims, No Drawings

HIGH TEMPERATURE STABLE ADHESIVE COMPOSITIONS EMPLOYING AROMATIC POLYIMIDE AND POLYISOIMIDE BIS-ACETYLENE ADDITIVES

BACKGROUND OF THE INVENTION

This invention relates to adhesive and sealant compositions including anaerobic curing compositions which exhibit improved strength properties at elevated temperatures as well as improved resistance to thermal degradation.

Adhesive and sealant compositions based on acrylic and substituted acrylic polymerizable monomers are known in the art. Anaerobic compositions employing such monomers are also well known. See, for instance, U.S. Pat. No. 2,895,950 issued on July 21, 1959 to V. Krieble. While useful in many applications where a strong adhesive bond is required, both standard as well as anaerobic acrylic adhesive compositions have been limited in applicability due to the degradative effect elevated temperatures greater than about 250° F. have on adhesive strength. U.S. Pat. No. 3,988,299 issued on Oct. 26, 1976 to B. Malofsky describes the increased resistance of diacrylate adhesives to high temperature degradation when maleimide compounds are employed in the adhesive composition.

There is a need in the adhesives art for other additives which provide adhesive compositions with improved resistance to thermal degradation as well as improved strength properties at elevated temperatures.

SUMMARY

According to the present invention by employing an additive from a specific class of bis-acetylene compounds an adhesive and sealant composition may be prepared which exhibits improved resistance to thermal degradation. Furthermore, by subjecting the composition further to moderate heat, improved adhesive strength is achieved over that of room temperature curing.

The adhesive composition comprises a mixture of an acrylic or substituted acrylic monomer and a normal polyimide or polyisoimide bis-acetylene additive having the formula:

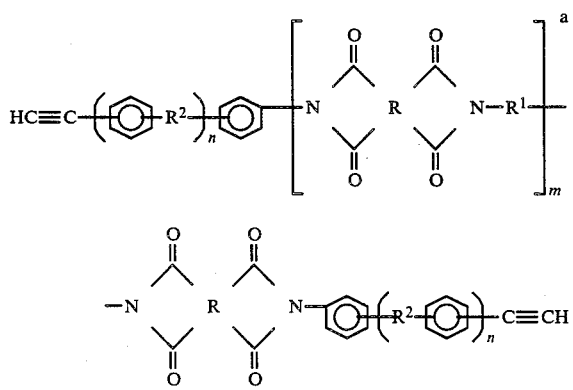

wherein
R is

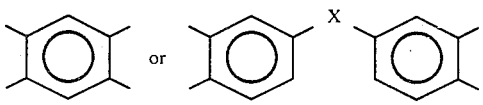

with Z being O, $CH_2$, S, CO, $SO_2$, CHOH, $-(CF_2)_p-$, $-CF_2-O-CF_2-$, $-C(CF_3)_2-$, or a bond; $R^1$ is

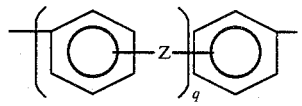

with Z being O, $CH_2$, S, CO, $SO_2$, CHOH, $-(CF_2)_p-$, $-CF_2-O-CF_2-$, $-C(CF_3)_2-$; and q being 0-5;
$R^2$ is O, $CH_2$, S, CO, $SO_2$, $-(CF_2)_p-$, $-CF_2-O-CF_2-$, $-C(CF_3)_2-$; with
p being 1-5;
n is 0 to 10; and
m is 0 or above and preferably 0 to 100; or

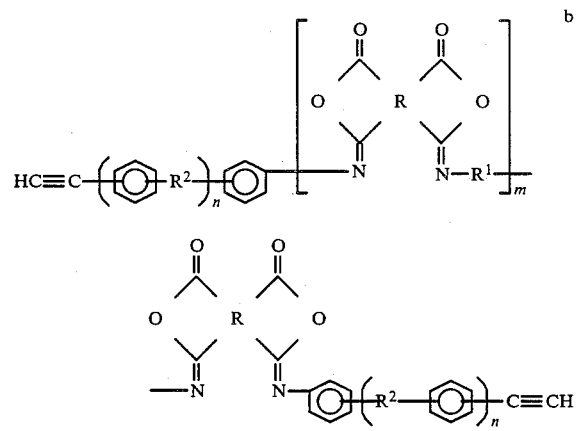

wherein R, $R^1$, $R^2$, n and m have the meanings given above.

The composition containing the normal polyimide additive is particularly useful in the anaerobic bonding of adjacent or closely facing surfaces at least one of which is metal, for example, the mating threads of a nut and bolt.

This invention further relates to a process for sealing or adhering surfaces comprising applying the composition of this invention to surfaces to be sealed or adhered.

DESCRIPTION OF THE PREFERRED EMBODIMENTS

One class of polymerizable acrylic monomers useful in the present compositions corresponds to the general formula:

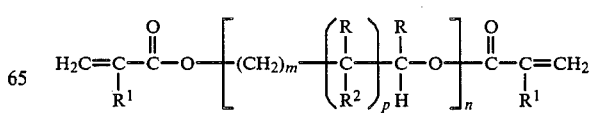

where

R is selected from the group consisting of hydrogen, methyl, ethyl,

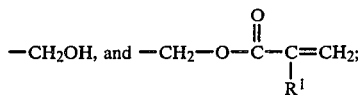

$R^1$ is selected from the group consisting of hydrogen, chlorine, methyl, and ethyl;
$R^2$ is selected from the group consisting of hydrogen, hydroxy, and

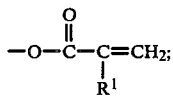

m is an integer equal to at least 1, e.g., from 1 to 8 or higher and preferably from 1 to 4 inclusive;
n is an integer equal to at least 1, e.g., from 1 to 20 or more; and
p is 0 or 1.

Monomers useful herein and which come within the above general formula include, for example, ethylene glycol dimethylacrylate, ethylene glycol diacrylate, polyethylene glycol diacrylate, tetraethylene glycol dimethacrylate, diglycerol diacrylate, diethylene glycol dimethacrylate, pentaerythritol triacrylate, and other polyether diacrylates and dimethacrylates.

A second class of acrylic monomers useful herein are the mono- and polyacrylate and methacrylate esters of bisphenol type compounds. These monomers may be described by the following formula:

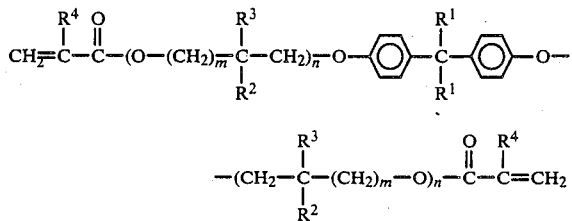

wherein
$R^1$ is methyl, ethyl, carboxyl or hydrogen;
$R^2$ is hydrogen, methyl or ethyl;
$R^3$ is hydrogen, methyl or hydroxyl;
$R^4$ is hydrogen, chlorine, methyl or ethyl;
n is an integer having a value of 0 to 8; and
m is 0 or 1.

Representative monomers of the above-described class include: dimethacrylate and diacrylate esters of 4,4'-bishydroxyethoxy-bisphenol A and dimethacrylate and diacrylate esters of bisphenol A. These monomers are described in Japanese Pat. Publication 70-15,640 of K. Orite, M. Natsume, and N. Shimade in 1970.

In the production of the adhesives compositions herein small amounts (i.e. less than about 10% based on the total weight of the composition) of optional polymerizable monomers may be employed. Examples of suitable monomers include hydroxyethyl (meth)acrylate, hydroxypropyl (meth)acrylate, methyl methacrylate, diacetone acrylamide, 2-cyanoethyl acrylate, 2-chloroethyl acrylate, 2-hydroxy-3-chloropropyl methacrylate, propargyl methacrylate, (meth)acrylic acid, itaconic acid, citraconic acid, maleic acid, and the like.

It is to be understood that the various monomers useful herein are not required to be in a highly purified state. The monomers may be comprised of commercial grades in which inhibitors, stabilizers, or other additives or impurities may be present, as well as those prepared in the laboratory or on a pilot plant scale.

Methods for preparing the bis-acetylene additives useful in the present invention are known in the art. U.S. Pat. Nos. 3,845,018 and 3,879,349 issued on Oct. 29, 1974 and Apr. 22, 1975, respectively to N. Bilow et al.; 4,097,456 issued on June 27, 1978 to W. Barie, Jr.; and 4,405,770 issued on Sept. 20, 1983 to J. Schoenberg describe the preparation of acetylene substituted polyimide oligomers. See also Hergenrother, P.M., "Acetylene-terminated Imide Oligomers and Polymers Therefrom", Polymer Preprints, Am. Chem. Soc., Vol. 21 (#1), pgs. 81–83 (March 1980). European Patent Application No. 71,372 published on Feb. 9, 1983 to A. Landis describes the preparation of acetylene substituted polyisoimide oligomers.

The oligomers are generally prepared by a reaction sequence which proceeds by first reacting a diamine with a stoichiometric excess of an aromatic tetracarboxylic acid, a lower alkyl ester thereof including the diester-diacids and tetraesters or preferably a dianhydride in the presence of a sufficient amount of a solvent such as dimethylformamide, dimethylacetamide, or N-methyl-2-pyrrolidone. The resultant anhydride-capped polyamic acid or the corresponding acid- or ester capped analog intermediate is then reacted with an aminoaryleneacetylene. After the reaction has been completed the product is in the polyamic acid form which can then be cyclized by thermal or chemical dehydration to form the acetylene terminated polyimides.

Thermal dehydration of the polyamic acid intermediate with the azeotropic removal of water results in the production of a normal polyimide species.

Chemical dehydration, on the other hand, employing such dehydrating agents as trifluoracetic anhydride, acetic anhydride, or N,N'-dicyclohexylcarbodiimide at relatively low temperatures produces substantial amounts of the isoimide species. The polyisoimide structurally shown as "b" above has all potential sites where either an isoimide or imide group could form arbitrarily shown in the isoimide form. It should be recognized by those skilled in the art that in the chemical dehydration of amic acids, there is a tendency for imide groups to be formed and interspersed randomly with the isoimide groups of the oligomer. Therefore it is understood that after chemical dehydration of polyamic acids the formation of both the corresponding isoimider and/or isoimide-imide containing oligomers may be present. The isoimide is also structurally shown as being in the cis isomer form. For the purposes of this invention, either the cis or trans isomers of the isoimide oligomers are useful herein.

While the isoimides are useful in nonanaerobic systems, it is noted that these oligomers act as polymerization initiators in anaerobic systems and as such are not recommended in anaerobic adhesives where a good shelf-life is required.

Aromatic tetracarboxylic acids, esters or dianhydrides which have not been polymerized with diamines may be reacted with aminoaryleneacetylenes then cyclized to produce additives which are also useful herein. Preferred additives include those prepared with either pyromellitic dianhydride or benzophenone tetracarboxylic dianhydride and aminophenylacetylene.

In particular N,N'-bis(ethynylphenyl)-1,2,4,5-benzenetetracarboxylic diimide, not previously described in the literature, was found to be a very effective additive herein. Anaerobic adhesives containing this additive possessed superior shear strength after heat curing as well as heat stability after aging. The tetracarboxylic dianhydrides useful in the preparation of the bis-acetylene additives herein may have the formula:

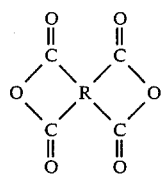

wherein R is

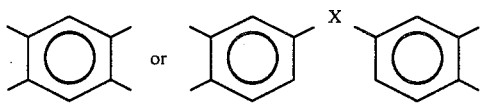

While the nature of R is not critical, R should not contain any group which would adversely affect the composition for purposes disclosed herein. For example, we have found that naphthenic or other ladder-type groups are not applicable in the preparation of the adhesive additive due to their lack of flexibility and/or solubility in the cured adhesive system. Most commonly X is selected from the group consisting of CO, $CH_2$, O, S, or a bond. The use of pyromellitic dianhydride or benzophenone tetracarboxylic dianhydride (BTDA) are preferred.

The diamines useful herein have the formula $H_2N-R^1-NH_2$ wherein $R^1$ is

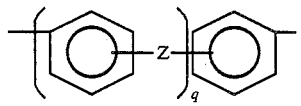

and Z and q are as previously defined. The $R^1$ group may bear one or more groups selected from the group of chlorine, methyl, phenyl, or ethynyl. The use of 1,3-bis(3-aminophenoxy) benzene is preferred.

The aminoarylacetylenes useful herein have the formula:

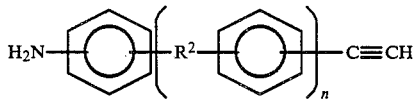

wherein $R^2$ and n are as previously defined. The use of meta-aminophenylacetylene (APA) is preferred. Meta substitution of the acetylene group relative to the amino or R group is preferred in that the resulting angle of the polyimide will not be perfectly linear, as some asymmetry will be introduced into the molecular structure.

The aminoarylacetylenes useful herein may be prepared in a number of ways. See for example, Prepr. Div. Pet. Chem. Am. Chem. Soc., Vol. 24, (#1), 233(1979) which describes the preparation of APA. U.S. Pat. Nos. 4,128,588 and 4,204,078 issued on Dec. 5, 1978 and May 20, 1980 respectively to E. Sabourin et al. describe improved methods for preparing nitrophenylacetylene, a precurser for APA. U.S. Pat. No. 3,928,450 issued on Dec. 23, 1975 to N. Bilow et al. describes the preparation of aminoarylacetylenes wherein the aryl group is phenoxy phenylene or phenylene thiophenylene.

In general the adhesive compositions which employ the polyimide or polyisoimide bis-acetylene additives herein are readily cured by application of moderate heat. The useful concentration range for the additives is about 1 to about 50, preferably 15 to 40, and most preferably 20 to 30 percent by weight of the total composition.

In a preferred embodiment, the adhesive compositions may be rendered anaerobic by the inclusion of an initiator for free radical polymerization. Useful free radical initiators include hydrogen peroxide and peroxy compounds such as organic hydroperoxides (e.g. cumene, t-butyl, and methylethyl ketone hydroperoxides), peroxides (e.g. benzoyl, cyclohexyl, and hydroxycyclohexyl peroxides), and peresters (e.g. t-butyl perbenzoate and t-butyl peracetate); diazosulfones; alpha-amino sulfones (e.g. N-(o- or p-carboethoxyphenyl)-(p-tolylsulfonemethyl) amine); or azo compounds (e.g. 2,2'-azobis(isobutyronitrile). While any free-radical polymerization initiator may be employed, the use of cumene hydroperoxide is preferred. Alternatively anaerobic systems may be prepared which do not require peroxy initiators but wherein the necessary active oxygen is generated in situ.

Activators useful herein may be added to the anerobic formulation in amounts conventional in the art, i.e. on the order of about 0.01 to 12% dry weight of the total composition. Such activators include for example, secondary and tertiary organic amines. While the monomeric disulfonimides provide best results when used as the sole activator in the anaerobic formulations, it is also within the scope of the invention to add, in addition, known activators such as saccharin (orthosulfobenzimide) and the sulfonamides of the prior art.

In order to improve the storage stability of the composition, it is preferable, but not necessary, that the composition contain a stabilizer such as an inhibitor of free radical polymerization. Suitable inhibitors include those conventionally employed, such as hydroquinones, benzoquinone, naphthoquinone, p-t-butyl catechol, phenothiazine, sterically hindered phenols, etc. The amount of inhibitor employed depends, for example, on the type of monomer used, as well as the free radical initiator used. Generally, it ranges from 0.0001 to 0.1% by weight, based on monomer, preferably 0.0025 to 0.05%. While the monomer will normally be obtained with a certain amount of inhibitor present therein, additional inhibitor may be added as necessary at any time to bring the amount up to the required level.

The presence of chelating agent (chelator) is also preferable, but not necessary, and it provides the compositions herein with better stability. The chelator is defined, herein, as a compound capable of complexing with a metal atom through coordination bonds between the metal and the ligand atoms of the chelator to form a heterocyclic ring. Although many chelating agents are suitable, the preferred chelators are oxalic acid and those compounds having a combination of oxygen and nitrogen ligand atoms such as hydroxyquinoline and the -aminocarboxylates such as tetrasodium ethylenediamine tetracetic acid ($Na_4EDTA$). In general, the chelator useful herein should preferably be soluble in the monomer. The amount of the chelator employed depends mainly on the type of chelator, but also to a minor extent on the amounts and types of other ingredients in the composition. Amounts from about 0.0001% to about 0.1% by weight of the total composition may be employed, depending upon the particular chelator added. It is noted that with certain chelators, the amount thereof must not exceed about 0.01% by weight to obtain an adhesive having good properites. When these chelators are added in amounts above this limit, the bond strength of the adhesive decreases dramatically. The practitioner will readily discover which chelators may be added in which amounts to best advantage. The lower limit of chelator is determined by the minimum stability desired in the composition. Preferred amounts of chelator range from 0.001 to 0.02% by weight.

Various other additives known to the skilled practitioner may also be incorporated in the compositions such as thicknneners, plasticizers, etc., provided they do not deleteriously effect the additive for its intended purpose.

The additives herein, when employed in the adhesive compositions provide adhesives which at elevated temperatures possess improved resistance to degradation as well as greater adhesive bond strength.

The following examples will further describe and illustrate the practice of this invention but they are not intended to limit its scope. In these examples the compositions were prepared by mixing the indicated ingredients in amounts given as parts by weight unless otherwise specified.

EXAMPLE 1

Preparation of N,N'-Bis(3-ethynylphenyl)-1,2,4,5-benzenetetracarboxylic diimide

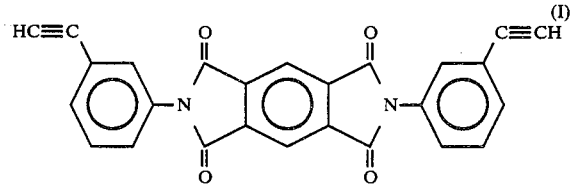

To a 500 ml multi-necked round bottom flask, equipped with mechanical stirrer, reflux condensor, thermometer and Dean-Stark trap and maintained under a positive pressure of nitrogen was added 30 g. (0.26 mole) of 3-aminophenylacetylene (APA) and 125 ml of dry N,N-dimethylacetamide (DMA). A total of 32.2 g. (0.13 mole at 85%) of pyromellitic dianhydride was added at such a rate as to maintain the temperature of the mixture below 50° C. The mixture was then stirred for 1 hour at room temperature. Seventy (70) ml of toluene was added to the flask and the mixture was heated to azeotropic distillation (85°–100° C.) to remove the water of imidization. After no more water was produced (10 hours) the reaction solution was cooled to room temperature and 100 ml of cold toluene was added. The diimide (I) which precipitated was filtered, washed with cold toluene and then dried in an air circulating oven at 95° C. overnight to yield 48.2 g (0.12 mole, 89% theoretical).

Analysis for $C_{26}H_{12}N_2O_4$ (M.W.=417.21): Calculated: % C, 74.85; % H, 3.09; % N, 6.71. Found % C, 73.36; % H, 3.24; % N, 7.04.

IR (KBr pellet) analysis: 3280 $cm^{-1}$ —C≡CH), 1780 and 1725 $cm^{-1}$ (imide C=O).

EXAMPLE 2

Preparation of N,N'-Bis(3-ethynylphenyl) benzophenone tetracarboxylic diimide

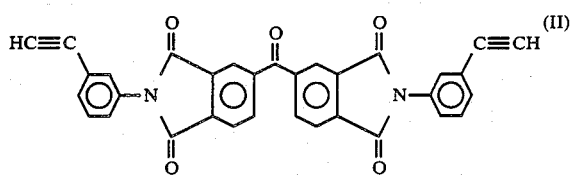

The diimide was prepared as in Example 1 employing 30 g APA, 155 ml DMA, and 42 g (0.13 mole) of benzophenone tetracarboxylic dianhydride (BTDA). The diimide (II) was recovered as in Example 1 yield 57 g (0.11 mole, 85% theoretical). Diimide II had a melting point of 330° C. IR (KBr) analysis: 3260 $cm^{-1}$(—C≡CH), 1780 and 1725 $cm^{-1}$ (imide C=O).

EXAMPLE 3 (Comparative)

Preparation of N,N'-Bis(4-methylphenyl)benzophenone tetracarboxylic diimide

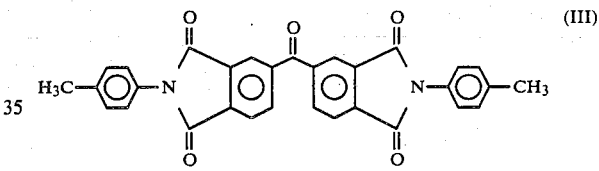

The diimide was prepared and recovered as in Example 2 employing 27.8 g (0.26 mole) of p-toluidine instead of APA to yield 69.3 g (0.13 mole, quantitative) of III. IR (KBr) analysis: 1790 and 1730 $cm^{-1}$ (imide C=O).

EXAMPLE 4 (Comparative)

Preparation of N,N'-Bis(3-ethynylphenyl) naphthalene tetracarboxylic diimide

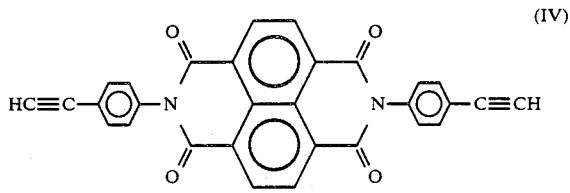

To a 500 ml multi-necked round bottom flask, equipped with a mechanical stirrer, reflux condensor and thermometer, maintained under a positive pressure of argon, was added 21 g (0.18 mole) of APA, 25 g (0.09 mole) of 1,4,5,8-naphthalenetetracarboxylic dianhydride and 225 ml of DMA. The reaction mixture was heated to 100° C. at which point a complete solution was effected. After about 45 minutes at this temperature a precipitate began to form at which point a Dean-Stark trap was attached and 75 ml of toluene was added in order to azeotrope the water of imidization. When no more water was produced, the imide was recovered as in Example 1. The solid bis-imide IV (38 g, 0.08 mole; 90% theoretical) decomposed at temperatures above 280° C. (536° F.) IR (KBr) analysis: 3275 cm$^{-1}$ (—C≡CH), 1790 and 1715 cm$^{-1}$ (imide C=O).

EXAMPLE 5 (Comparative)

Preparation of N-(3-Ethynylphenyl) phthalimide

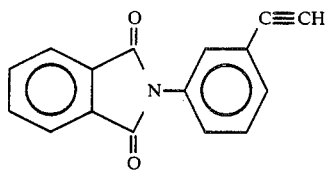

To a reaction apparatus as described in Example 1 which was maintained under a positive pressure of argon was added 20 g (0.171 mole) APA and 125 ml of DMA. To this stirred solution was slowly added 25.3 g (0.171 mole) phthalic anhydride at such a rate as to maintain the temperature of the mixture below 50° C. The mixture was then stirred for 1 hour at room temperature. Seventy (70) ml of toluene was added to the flask and the mixture was heated to azeotropic distillation to remove the water of imidization. When no further water was collected the remainder of the toluene was distilled. The reaction solution (at 50° C.) was poured into 1500 ml of distilled water. The imide (V) precipitated, was filtered, washed with water, and then dried in an air circulating oven at 95° C. overnight to yield 39.5 g (0.160 mole, 93% theoretical). The imide had a melting point of 197°-198° C. (387° F.). IR (KBr) analysis: 3280 cm$^{-1}$ (—C≡CH), 1780 and 1720 cm$^{-1}$ (imide C=O).

EXAMPLE 6

This illustrates the use of various bis-acetylene additives in an anaerobic adhesive formulation.

Anaerobic adhesive compositions were prepared comprising the following basic formulation:

|  | CONTROL | TEST |
|---|---|---|
| Ethoxylated bis-phenol A dimethacrylate | 95.5% | 70.5% |
| Ortho-sulfobenzimide | 1.5% | 1.5% |
| Cumene hydroperoxide | 3.0% | 3.0% |
| Additive | 0 | 25.0% |
| Oxalic acid | 25 ppm | 25 ppm |
| (Na₄EDTA) | 100 ppm | 100 ppm |
| 2-methoxy-1,4-naphthoquinone | 50 ppm | 50 ppm |

The following additives were tested:

| SAMPLE | ADDITIVE |
|---|---|
| A | N,N′—bis (2-ethynylphenyl)-1,2,4,5-benzenetetracarboxylic diimide (I) |
| B | N,N′—bis (3-ethynylphenyl)benzophenone tetracarboxylic diimide (II) |
| C | Thermid ® MC-600* |
| D - Comparative | 1,1′-(Methylene di-4,1-phenylene) bis-maleimide** |
| E - Comparative | N,N′—bis (4-methylphenyl) benzophenone tetracarboxylic diimide (III) |
| F - Comparative | N,N′—bis (3-ethynylphenyl) naphthalene tetracarboxylic diimide (IV) |
| G - Comparative | N—(3-ethynylphenyl) phthalimide (V) |

*Bis-acetylene polyimide having formula "a" (described above) wherein R is [structure], R¹ is [structure], m is 1 and n is 0 obtained from National Starch and Chemical Corporation.
**Bis-maleimide as described in U.S. Pat. No. 3,988,299.

Each test adhesive formulation was prepared by the following procedure:

A 100 ml high density polyethylene vessel was charged with 35.2 parts ethoxylated bis-phenol A dimethacrylate, 12.5 parts additive, 0.75 parts saccharin and 0.00125 parts oxalic acid. With stirring the mixture was heated to 65°-70° C. before 0.005 parts of ethylenediamine tetracetic acid (5% in methanol) was added. The mixture was maintained at 65°-70° C. for 2–3 hours and then 0.0025 parts 2-methoxy-1,4-naphthoquinone was added. The mixture was cooled to a temperature below 50° C. and then 1.5 parts cumene hydroperoxide was introduced. The mixture was stirred for an additional 3 hours.

Portions of the adhesive compositions prepared were heated to 82° C. and observed for gel formation. This is a common accelerated aging test to determine the shelf life stability of an anaerobic adhesive. If the gel-time of a sample at 82° C. is less than one hour, it indicates that the sample would have an unacceptable shelf life. See Table I for data.

The adhesive compositions were applied to steel pins and collars and allowed to cure at room temperature for 48 hours. Thereafter, the samples were aged at 450° F. for the period of time indicated. After a designated time period four samples employing each adhesive were cooled to room temperature and then the pins were pressed from the collars with an Instron tester which measures the shear strength of the adhesive in pounds per square inch (psi). The results may be found in Tables I and II which give the average strength of each set of the samples.

TABLE I

| Additive | Gel Time (Hrs) | Days at 450° F. (psi)[2] | | | | | |
|---|---|---|---|---|---|---|---|
| | | 0[1] | 14 | 28 | 35 | 42 | 56 |
| Control | 4.6 | 2547 | 1732 | — | 0 | | |
| A | 6+ | 3002 | 4767 | — | 3912 | 3675 | 2322 |
| B | 4–5 | 3000 | 3948 | — | 3039 | 2630 | 1236 |
| C | 1+ | 2216 | 3639 | — | 1223 | 888 | 143 |
| D | 2–3 | 3057 | 2700 | — | 248 | 67 | 146 |
| E | 3–3.5 | 2300 | 2344 | — | 182 | 109 | 0 |
| F | — | 2737 | 618 | 226 | — | 151 | 36 |
| G | — | 3011 | 926 | 177 | — | 22 | 0 |

[1]Cured at room temperature for 48 hours.
[2]Aging ovens were turned off twice for two days during the third and fourth weeks of aging.

TABLE II

| Additive | Days at 450° F. (psi) | | | | | | | |
|---|---|---|---|---|---|---|---|---|
| | 0[1] | 7 | 14 | 21 | 24 | 28 | 38 | 46 | 60 |
| Control | 2445 | 2431 | 1310 | 335 | | | | | |
| A | 2164 | — | 5531 | 4785 | | | | | |
| B | 3000 | 3712 | — | 4076 | — | — | — | 3493 | 3384 |
| C | 2200 | — | 3421 | — | 3257 | | | | |
| D | 3057 | 2610 | — | — | 3221 | — | 1135 | | |

[1]Cured at room temperature for 48 hours.

The results of Table I indicate that only the adhesives which contained the specific additives disclosed herein (A, B, and C) dramatically improved in adhesive strength after 14 days of aging at 450° F. All other adhesive compositions either immediately began to lose adhesive strength or stayed approximately the same under the same conditions. It should be noted that neither the mono-acetylene additive (G) or the nonacetylene terminated polyimide (E) significantly benefited the adhesive composition over the control. The napthenic polyimide additive (F) also did not show the improvement in strength after heat curing or the heat tolerance of the bis-acetylene additives disclosed herein. The interruption of heat during the third and fourth weeks of aging simulated the non-uniform heating of samples which might occur in the field. Again, only the adhesives containing additives A, B, or C were able to withstand such a change in conditions, a circumstance which might cause loss of adhesive strength due to cracking.

The results of Table II also showed increases in bond strength after heat curing as well as improved heat tolerance by the adhesives which employed the additives disclosed herein over the performance of the control.

EXAMPLE 7

The adhesive formulations prepared in Example 6 were also applied to black oxide nuts and bolts. The 30 samples were cured at room temperature for 48 hours then oven-aged at 450° F. for three weeks. At 0, 2, and 3 weeks, five test samples were cooled to room temperature then evaluated for "break/prevail" strength measured with a torque wrench inch-pounds. The break strength measures the force necessary to initially break the bond between the nut and the bolt. The prevail strength is determined by unwinding the nut from the bolt 360 degrees from the break point and averaging the force measured after each 90 degree turn. The averaged results are found in Table III.

TABLE III

| Sample | 0 week[1] | Time at 450° F. | |
| --- | --- | --- | --- |
| | | 2 week | 3 week |
| Control + no additive | 170/257 | 75/103 | 52/61 |
| Control + A | 275/248 | 310/335 | 220/266 |
| Control + B | 255/192 | 185/364 | 155/259 |
| Control + C | 235/309 | 190/360 | 130/186 |
| Control + E | 195/198 | 125/155 | 105/144 |
| Control + G | 290/246 | 125/179 | 65/115 |

[1] Break/Prevail measured after cure at room temperature for 48 hours.

The results indicated that samples employing the adhesive formulations disclosed herein had significantly improved heat tolerance over the control adhesive.

EXAMPLE 8

This example illustrates the improved thermal resistance of another adhesive formulation disclosed herein over that of a control which contained no bis-acetylene additive.

An anaerobic adhesive was prepared as in Example 6 except that only diimide II was employed and the base monomer was triethylene glycol dimethacrylate. Black oxide nuts and bolts were adhered and tested as in Example 7. Break/prevail results may be found in Table IV.

TABLE IV

| Sample | 0 week | Time at 450° F. | |
| --- | --- | --- | --- |
| | | 1 week | 2 week |
| Control + no additive | 156/263 | — | 0/0 |
| Control + 25% additive | 225/442 | 140/308 | 138/267 |

As will be recognized by those skilled in the art, the present invention provides curing compositions useful as adhesives and sealants. Variations may be made in ingredients, proportions, and procedures as long as such variations are within the scope and spirit of the following claims.

We claim:

1. An anaerobic adhesive composition comprising a mixture of (A) an acrylic or substituted acrylic monomer selected from the group consisting of:

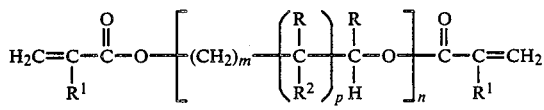

where
R is selected from the group consisting of hydrogen, methyl, ethyl,

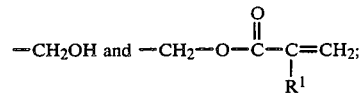

$R^1$ is selected from the group consisting of hydrogen, chlorine, methyl and ethyl;
$R^2$ is selected from the group consisting of hydrogen, hydroxy, and

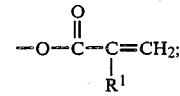

m is an integer from 1 to 8;
n is an integer from 1 to 20;
p is 0 or 1;

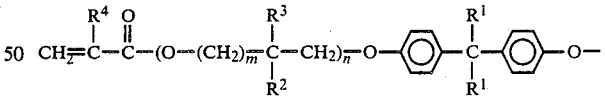

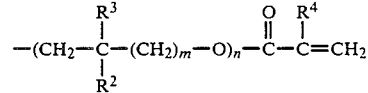

wherein
$R^1$ is methyl, ethyl, carboxyl or hydrogen;
$R^2$ is hydrogen, methyl of ethyl;
$R^3$ is hydrogen, methyl or hydroxyl;
$R^4$ is hydrogen, chlorine, methyl or ethyl;
n is an integer having a value of 0 to 8; and
m is 0 or 1;
and mixtures thereof; and (B) about 1 to 50% by weight of the total composition of an additive selected from the group consisting of a polyimide having a structure

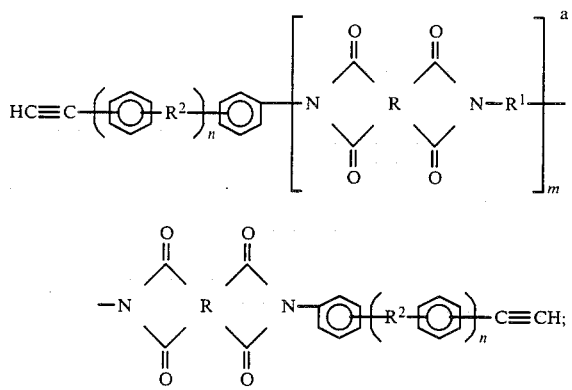

a polyisoimide having a structure

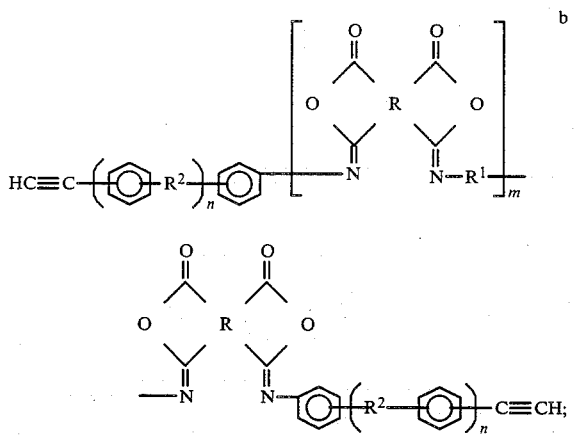

and mixtures thereof;
wherein
R is

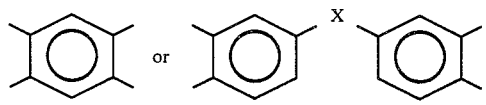

with X being O, CH$_2$, S, CO, SO$_2$ CHOH, —(CF$_2$-)$_p$—, —CF$_2$—O—CF$_2$—, —C(CF$_3$)$_2$—, or a bond;
R$^1$ is

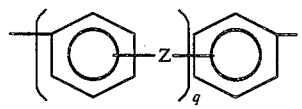

with Z being O, CH$_2$, S, CO, SO$_2$ CHOH, —(CF$_2$-)$_p$—, —CF$_2$—O—CF$_2$—, —C(CF$_3$)$_2$—, and q being 0–5;

R$^2$ is O, CH$_2$, S, CO, SO$_2$, —(CF$_2$)$_p$—, —CF$_2$—O—CF$_2$—, —C(CF$_3$)$_2$—, with p being 1–5;

n is 0 to 10; and m is 0 or above; and (C) about 0.1 to 10% by weight of the total composition of a free-radical polymerization initiator sufficient to initiate cure at room temperature in the absence of air or oxygen and on contact with a metal surface.

2. The composition of claim 1, wherein the monomer is ethoxylated bis-phenol A dimethacrylate or triethylene glycol dimethacrylate.

3. The composition of claim 1, wherein the additive is the polyimide having the structure a.

4. The composition of claim 3, wherein R is

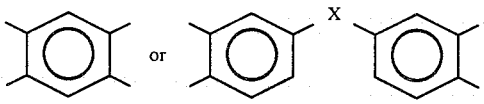

R$^1$ is

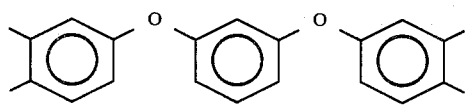

m is 0–1; and n is 0.

5. The composition of claim 4 wherein the additive is N,N'-bis(3-ethynylphenyl)-1,2,4,5-benzenetetracarboxylic diimide or N,N'-bis(3-ethynylphenyl) benzophenone tetracarboxylic diimide.

6. The composition of claim 1, wherein the free-radical polymerization initiator is a peroxy compound.

7. The composition of claim 6, wherein the peroxy compound is cumene hydroperoxide.

8. The composition of claim 6, further comprising about 0.01 to 12% by weight of the total composition of an activator.

9. A process for providing a seal between adjacent surfaces, the seal having improved thermal properties, comprising applying the composition of claim 1 to either of the surfaces, placing the surfaces in abutting relationship, and allowing the composition to room temperature cure.

10. The process of claim 9, wherein the additive in said composition is N,N'-bis(3-ethynylphenyl)-1,2,4,5-benzenetetracarboxylic diimide or N,N-bis(3-ethynylphenyl) benzophenone tetracarboxylic diimide.

11. The composition of claim 1 which additionally contains about 0.01 to 12 percent by weight of the total composition of an activator of anaerobic polymerization.

* * * * *